United States Patent
Viswambharan et al.

(10) Patent No.: US 12,309,582 B2
(45) Date of Patent: May 20, 2025

(54) MULTI-FACTOR AUTHENTICATION FOR IOT DEVICES

(71) Applicant: Cisco Technology, Inc., San Jose, CA (US)

(72) Inventors: Rajesh Indira Viswambharan, Karnataka (IN); Ram Mohan Ravindranath, Karnataka (IN); Prashanth Patil, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 223 days.

(21) Appl. No.: 18/052,013

(22) Filed: Nov. 2, 2022

(65) Prior Publication Data

US 2024/0147232 A1 May 2, 2024

(51) Int. Cl.
*H04W 12/06* (2021.01)
*H04L 9/40* (2022.01)
*H04W 12/63* (2021.01)

(52) U.S. Cl.
CPC .............. *H04W 12/06* (2013.01); *H04L 63/20* (2013.01); *H04W 12/63* (2021.01); *H04L 2463/082* (2013.01)

(58) Field of Classification Search
CPC ...... H04W 12/06; H04W 12/63; H04L 63/20; H04L 2463/082; H04L 63/107
See application file for complete search history.

(56) References Cited

U.S. PATENT DOCUMENTS

| | | | |
|---|---|---|---|
| 2018/0234461 A1* | 8/2018 | Mahaffey | H04L 63/20 |
| 2021/0112411 A1 | 4/2021 | Pazhyannur et al. | |
| 2021/0153016 A1 | 5/2021 | Ben Henda et al. | |
| 2021/0185529 A1* | 6/2021 | Patil | H04W 8/04 |
| 2022/0116774 A1* | 4/2022 | Rajadurai | H04L 63/061 |
| 2022/0191251 A1* | 6/2022 | Gavish | H04L 63/108 |
| 2022/0210636 A1 | 6/2022 | Gupta et al. | |
| 2023/0247003 A1* | 8/2023 | Chanak | H04L 9/3226 726/1 |

OTHER PUBLICATIONS

Emin Huseynov, "Context-Aware Multifactor Authentication for the Augmented Human," May 12, 2020, pp. 1-126.

* cited by examiner

*Primary Examiner* — Anh Nguyen
(74) *Attorney, Agent, or Firm* — Polsinelli P.C.

(57) ABSTRACT

Disclosed herein are systems, methods, and computer-readable media for enabling multi-factor authentication (MFA) for an Internet Of Things (IoT) device. In one aspect, a method includes receiving a network connection request from the IoT device to connect to a network. In one aspect, the method includes fetching authentication information for the device in response to the request. In one aspect, the method includes authenticating the device to the network. In one aspect, the method includes in response to the authentication of the device to the network, establishing a network connection between the IoT device and the network. In one aspect, the method includes applying the MFA policy. In one aspect, the method includes after successful compliance with the MFA policy establishing a session between the device and the application over the network.

18 Claims, 11 Drawing Sheets

MULTI-FACTOR AUTHENTICATION FOR IOT DEVICES

FIELD OF THE INVENTION

The subject matter of this disclosure generally relates to the field of computer networking and, more particularly, to multi-factor authentication for IoT devices in a multi-cloud fifth-generation (5G) cellular service deployment.

BACKGROUND

Fifth generation (5G) mobile and wireless networks will provide enhanced mobile broadband communications and are intended to deliver a broader range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces. To support this wide range of services and network functions across an ever-growing base of user equipment (UE), 5G networks incorporate the network slicing concept utilized in previous generation architectures.

Current mobile and wireless communication systems have widely adopted a next-generation wireless communication system, 5G, that provides much higher data rates and lower latency.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
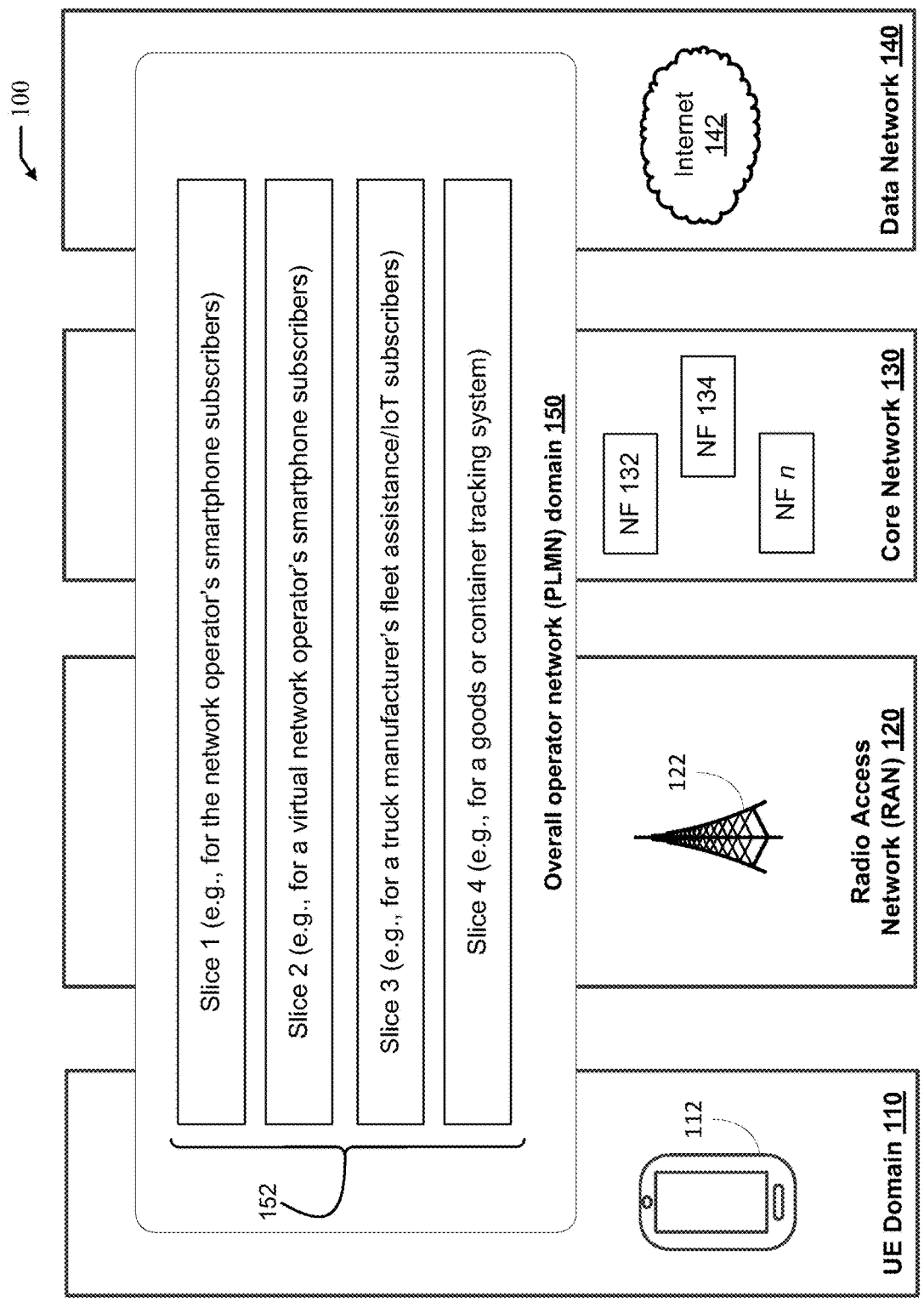
FIG. 1 depicts an example schematic representation of a 5G network environment in which network slicing has been implemented, and in which one or more aspects of the present disclosure may operate.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment, and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described, which may be exhibited by some embodiments and not by others.

The terms used in this specification generally have their ordinary meanings in the art, within the context of the disclosure, and in the specific context where each term is used. Alternative language and synonyms may be used for any of the terms discussed herein, and no particular significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein, is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms herein have the meaning commonly understood by one of ordinary skill in the art to which this disclosure pertains. In the case of conflict, the present document, including definitions, will control.

Additional features and advantages of the disclosure will be set forth in the description which follows and in part, will be evident from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

The present disclosure is directed toward supporting context-based multi-factor authentication (MFA) on the Authentication and Key Management for Applications (AKMA) layer.

In an example, a method can include enabling multi-factor authentication (MFA) for an Internet Of Things (IoT) device. The method can include receiving a network connection request from the IoT device to connect to a network. The method can include fetching authentication information for the device in response to the request. The authentication information can include subscription credentials to authenticate the IoT device to the network. The authentication information can also include an MFA policy that defines a user or location restriction to authentication of the IoT device to an application accessed over the network. The method can include authenticating the device to the network. The method further includes establishing a network connection between the IoT device and the network in response to the authentication of the device to the network. Accordingly, the method includes applying the MFA policy. The method includes establishing a session between the IoT device and the application over the network after successful compliance with the MFA policy.

In an example, the network is a cellular network that utilizes authentication and key management for applications (AKMA) to authenticate the IOT device to the cellular network.

In an example, the network is a cellular network, wherein the cellular network is a 4 G network, a LTE network, a 5 G network.

In an example, the controller is an AKMA Anchor Function.

In an example, the MFA policy defines an activation period, wherein the activation period determines whether the MFA policy is applied when authenticating the device to the network, or when the IoT device attempts to connect to the application.

In an example, the method further includes when the activation period defined by the MFA policy is a delayed activation policy that requires that the MFA policies should be applied with the IoT device attempts to establish the session with the application. The method further includes determining that the IoT device has requested to establish the session with the application before the MFA policy is applied.

In an example, in the instance where the MFA policy defines a time parameter, the method further includes determining that the time parameter is satisfied before the MFA policy is applied.

In an example, the MFA policy defines the location restriction, wherein the location restriction defines a location that the MFA device needs to be located to establish a session, and the method further includes determining that the location restriction is satisfied before the MFA policy is applied.

In an example, the MFA policy defines the user restriction, wherein the user restriction defines at least one user to provide the MFA.

In an example, the user restriction defines a first user to provide the MFA at first time or location, and a second user to provide the MFA at a second time or location.

In an example, the application is a plurality of applications, and the MFA policy defines a first MFA procedure for a first application of the plurality of applications and a second MFA procedure for a second application of the plurality of applications.

In an example, the method further includes enforcing the MFA policy upon successful MFA authentication and providing an application key and an expiration time for the application key to an application function associated with an application of the device In an example, a device for enabling multi-factor authentication (MFA) for an Internet Of Things (IoT) device can include one or more memories having computer-readable instructions and one or more processors configured to execute the computer-readable instructions. The instructions can cause one or more processors to receive a network connection request from the IoT device to connect to a network. The instructions can cause one or more processors to fetch authentication information for the device in response to the request. The authentication information can include subscription credentials to authenticate the IoT device to the network. The authentication information can also include an MFA policy that defines a user or location restriction to authentication of the IoT device to an application accessed over the network. The instructions can cause one or more processors to authenticate the device to the network. The instructions can cause one or more processors to establish a network connection between the IoT device and the network, in response to the authentication of the device to the network. The instructions can then cause one or more processors to apply the MFA policy. Followed by, the instructions causing one or more processors to establish a session between the IoT device and the application over the network after successful compliance with the MFA policy.

In an example, a non-transitory computer-readable storage medium having stored therein instructions which, when executed by a processor, can cause the computer to receive a network connection request from the IoT device to connect to a network. The processor can fetch authentication information for the device in response to the request. The authentication information can include subscription credentials to authenticate the IoT device to the network. The authentication information can also include an MFA policy that defines a user or location restriction to authentication of the IoT device to an application accessed over the network. The processor can authenticate the device to the network. The processor can establish a network connection between the IoT device and the network in response to the authentication of the device to the network. The processor can then apply the MFA policy. The processor can establish a session between the IoT device and the application over the network after successful compliance with the MFA policy.

Description of Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Enterprise networks require high availability, particularly in instances when private 5G solutions are offered. For instance, the use cases require greater than 99.99% availability including the ability to connect new IoT devices. This is particularly noteworthy for industrial automation applications but in general applicable to various private 5G deployments.

IoT devices are often required to apply authentication mechanisms with their application servers but are unable to sufficiently apply efficient authentication mechanisms. Furthermore, many IoT devices lack basic security fulfillment, which creates substantial risks of security threats. This warrants a sophisticated scheme of authentication to be supported between the IoT devices, their associated applications, and the IoT application server.

In typical 5G systems, the enablement of massive Internet of Things (mIoT) implicitly demands the support of authentication schemes for IoT devices, such as Authentication and Key Management for Applications (AKMA). AKMA focuses on leveraging operator authentication infrastructure to secure the communication between UE and an Application Function (AF). AKMA is operable to enable the authentication and generation of application keys based on 3GPP credentials for all IoT device types in the 5G system to ensure the effectiveness of bootstrapping the security between the UE and the applications in the 5G system.

This approach of authentication utilizing AKMA is based on the support of successful SIM-based primary authentication of the IoT device with the 5G network. Accordingly, AKMA key derivations and sharing with the 5G functions, UE, and IoT application server all will happen as a follow-up to the primary authentication. Multi-Factor Authentication (MFA), however, is not natively added to this effort. As such, this creates a communication with the application server that is permitted to transmit immediately after the IoT device is registered with the 5G network. Thus, this increases the chances of a potential security threat of an unauthorized person attempting to operate the device without proper authorization or user verification.

The disclosed technology addresses the need in the art for enterprises to enforce MFA for certain types of IoT applications to ensure that the underlying user of the application, location of use, and time of the usage of the application are verified in accordance with an established security policy. Furthermore, enterprises will benefit from the ability to enforce MFA dynamically in the event of a change of ownership of an IoT device, a change of location, or instances where multiple applications are bound to multiple users or a single user of the IoT device.

Prior to describing techniques for enabling multi-factor authentication (MFA) for an Internet of Things (IoT) device, one or more examples of enterprise networks/cloud computing infrastructures and 5G networks will be described with reference to FIGS. 1, and 2A-B.

FIG. 1 depicts an exemplary schematic representation of a 5G network environment 100 in which network slicing has been implemented, and in which one or more aspects of the present disclosure may operate. As illustrated, network environment 100 is divided into four domains, each of which will be explained in greater depth below; a User Equipment (UE) domain 110, e.g. of one or more enterprises, in which a plurality of user cellphones or other connected devices 112 reside; a Radio Access Network (RAN) domain 120, in which a plurality of radio cells, base stations, towers, or other radio infrastructure 122 resides; a Core Network 130, in which a plurality of Network Functions (NFs) 132, 134, . . . , n reside; and a Data Network 140, in which one or more data communication networks such as the Internet 142 reside. Additionally, the Data Network 140 can support SaaS providers configured to provide SaaSs to enterprises, e.g., to users in the UE domain 110.

Core Network 130 contains a plurality of Network Functions (NFs), shown here as NF 132, NF 134 . . . NF n. In some embodiments, core network 130 is a 5G core network (5GC) in accordance with one or more accepted 5GC architectures or designs. In some embodiments, core network 130 is an Evolved Packet Core (EPC) network, which combines aspects of the 5GC with existing 4G networks. Regardless of the particular design of core network 130, the plurality of NFs typically executes in a control plane of core network 130, providing a service-based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 130 can include one or more Access and Mobility Management Functions (AMF; typically used when core network 130 is a 5GC network) and Mobility Management Entities (MME; typically used when core network 130 is an EPC network), collectively referred to herein as an AMF/MME for purposes of simplicity and clarity. In some embodiments, an AMF/MME can be common to or otherwise shared by multiple slices of the plurality of network slices 152, and in some embodiments an AMF/MME can be unique to a single one of the plurality of network slices 152.

The same is true of the remaining NFs of core network 130, which can be shared amongst one or more network slices or provided as a unique instance specific to a single one of the plurality of network slices 152. In addition to NFs comprising an AMF/MME as discussed above, the plurality of NFs of the core network 130 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 100, an overall operator network domain 150 is defined. The operator network domain 150 is, in some embodiments, a Public Land Mobile Network (PLMN) and can be thought of as the carrier or business entity that provides cellular service to the end users in UE domain 110. Within the operator network domain 150, a plurality of network slices 152 are created, defined, or otherwise provisioned in order to deliver a desired set of defined features and functionalities, e.g., SaaSs, for a certain use case or corresponding to other requirements or specifications. Note that network slicing for the plurality of network slices 152 is implemented in an end-to-end fashion, spanning multiple disparate technical and administrative domains, including management and orchestration planes (not shown). In other words, network slicing is performed from at least the enterprise or subscriber edge at UE domain 110, through the Radio Access Network (RAN) 120, through the 5G access edge and the 5G core network 130, and to the data network 140. Moreover, note that this network slicing may span multiple different 5G providers.

For example, as shown here, the plurality of network slices 152 include Slice 1, which corresponds to smartphone subscribers of the 5G provider who also operates the network domain, and Slice 1, which corresponds to smartphone subscribers of a virtual 5G provider leasing capacity from the actual operator of network domain 150. Also shown is Slice 3, which can be provided for a fleet of connected vehicles, and Slice 4, which can be provided for an IoT goods or container tracking system across a factory network or supply chain. Note that these network slices 152 are provided for purposes of illustration, and in accordance with the present disclosure, and the operator network domain 150 can implement any number of network slices as needed, and can implement these network slices for purposes, use cases, or subsets of users and user equipment in addition to those listed above. Specifically, the operator network domain 150 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits the controlled composition of a PLMN with the specific network functions and provided services that are required for a specific usage scenario. In other words, network slicing enables a 5G network operator to deploy multiple independent PLMNs where each is customized by instantiating only those features, capabilities, and services required to satisfy a given subset of the UEs or a related business customer need.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g., based on the requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g., 5G service providers, and SaaS providers.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment, and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described, which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein, is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions, will control.

Additional features and advantages of the disclosure will be set forth in the description which follows and in part, will be obvious from the description or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

A method can include recognizing a SaaS provided by a SaaS provider for provisioning by the SaaS provider to an enterprise. Further, the method can include identifying one or more network slices within a network of a network service provider between the enterprise and the SaaS provider for provisioning the SaaS to the enterprise. As follows, the SaaS provider can be federated with the enterprise across one or more network service providers, including the network service provider used to provision the SaaS to the enterprise. Specifically, the SaaS provider can be federated with the enterprise by uniquely associating the one or more network slices provided by the network service provider with the SaaS provisioned by the SaaS provider to the enterprise using the one or more network slices.

A system can include one or more processors and at least one computer-readable storage medium storing instructions which, when executed by the one or more processors, cause the one or more processors to recognize a SaaS provided by a SaaS provider for provisioning by the SaaS provider to an enterprise. The instructions can cause one or more processors to identify one or more network slices within a 5G network of a network service provider between the enterprise and the SaaS provider for provisioning the SaaS to the enterprise. The instructions can also cause one or more processors to federate the SaaS provider with the enterprise across one or more network service providers, including the network service provider used to provision the SaaS to the enterprise. Specifically, the instructions can cause one or more processors to federate the SaaS provider with the enterprise by uniquely associating the one or more network slices provided by the network service provider with the SaaS provisioned by the SaaS provider to the enterprise using the one or more network slices.

A non-transitory computer-readable storage medium having stored therein instructions which, when executed by a processor, cause the processor to recognize a SaaS provided by a SaaS provider for provisioning by the SaaS provider to an enterprise. The instructions can cause the processor to identify one or more network slices within a network of a network service provider between the enterprise and the SaaS provider for provisioning the SaaS to the enterprise. The instructions can also cause the processor to federate the SaaS provider with the enterprise across one or more network service providers including the network service provider used to provision the SaaS to the enterprise. Specifically, the instructions can cause the processor to federate the SaaS provider with the enterprise by uniquely associating the one or more network slices provided by the network service provider with the SaaS provisioned by the SaaS provider to the enterprise using the one or more network slices. The instructions can also cause the processor to register an OAuth client of the SaaS for the one or more network slices between the enterprise and the SaaS provider as part of federating the SaaS provider with the enterprise across the one or more network slices. Enterprise client access to the SaaS through the one or more network slices can be controlled based on the OAuth client for each network slice of the one or more network slices.

Example Embodiments

The disclosed technology addresses the need in the art for federating SaaS providers with enterprises across network slices. Additionally, the disclosed technology address the need in the art for federating SaaS providers with enterprises across network slices in order to manage SaaSs provided by the SaaS providers to the enterprises. The present technology involves system, methods, and computer-readable media federating SaaS providers with enterprises across network slices used to provision SaaSs to the enterprises by the SaaS providers. Additionally, the present technology involves systems, methods, and computer-readable media for federating SaaS providers with enterprises across network slices in order to manage SaaSs provisioned by the SaaS providers to the enterprises across the network slices.

Figure 2A:
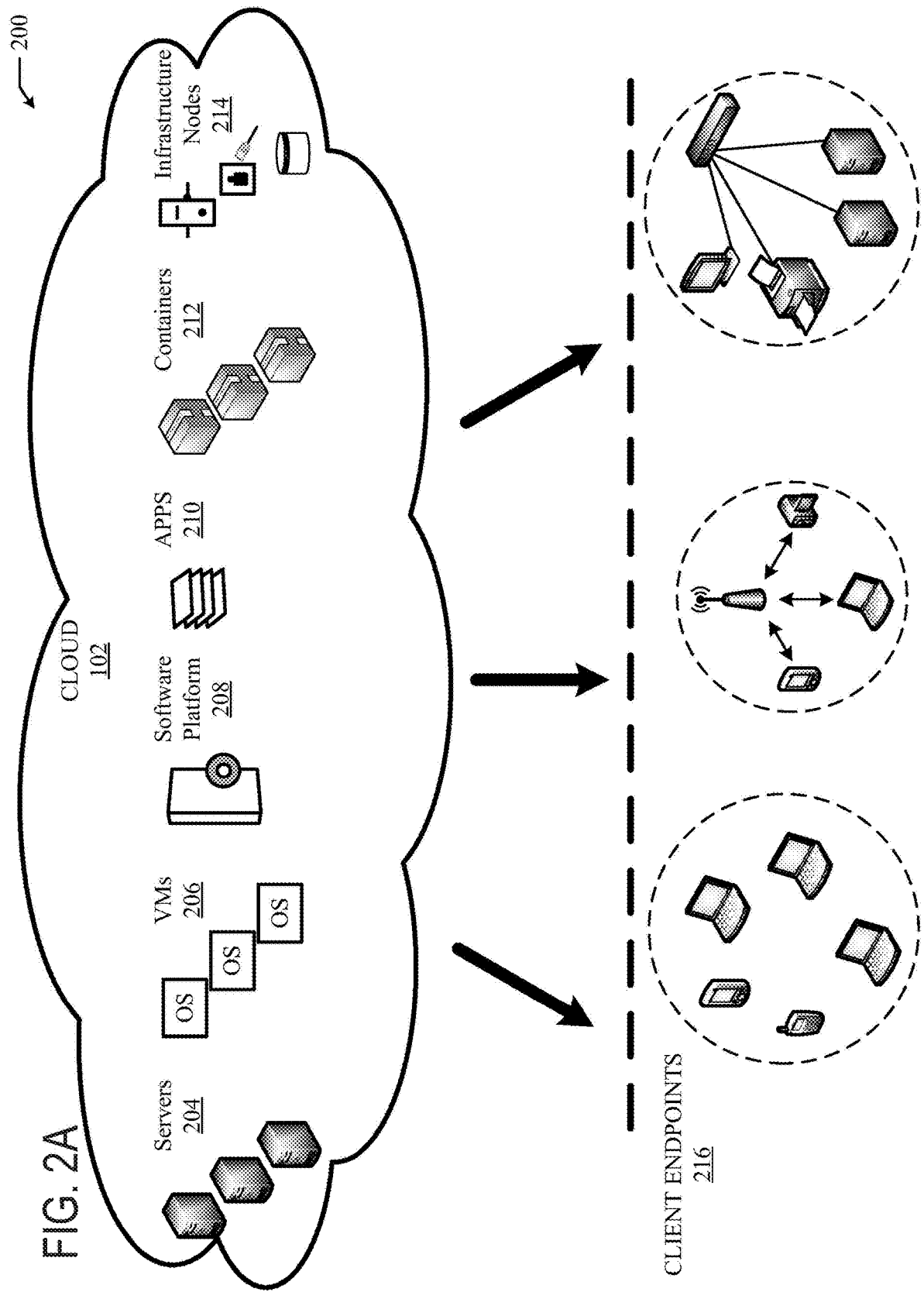
FIG. 2A illustrates an example cloud computing architecture in accordance with some aspects of the present disclosure.
Figure 2B:
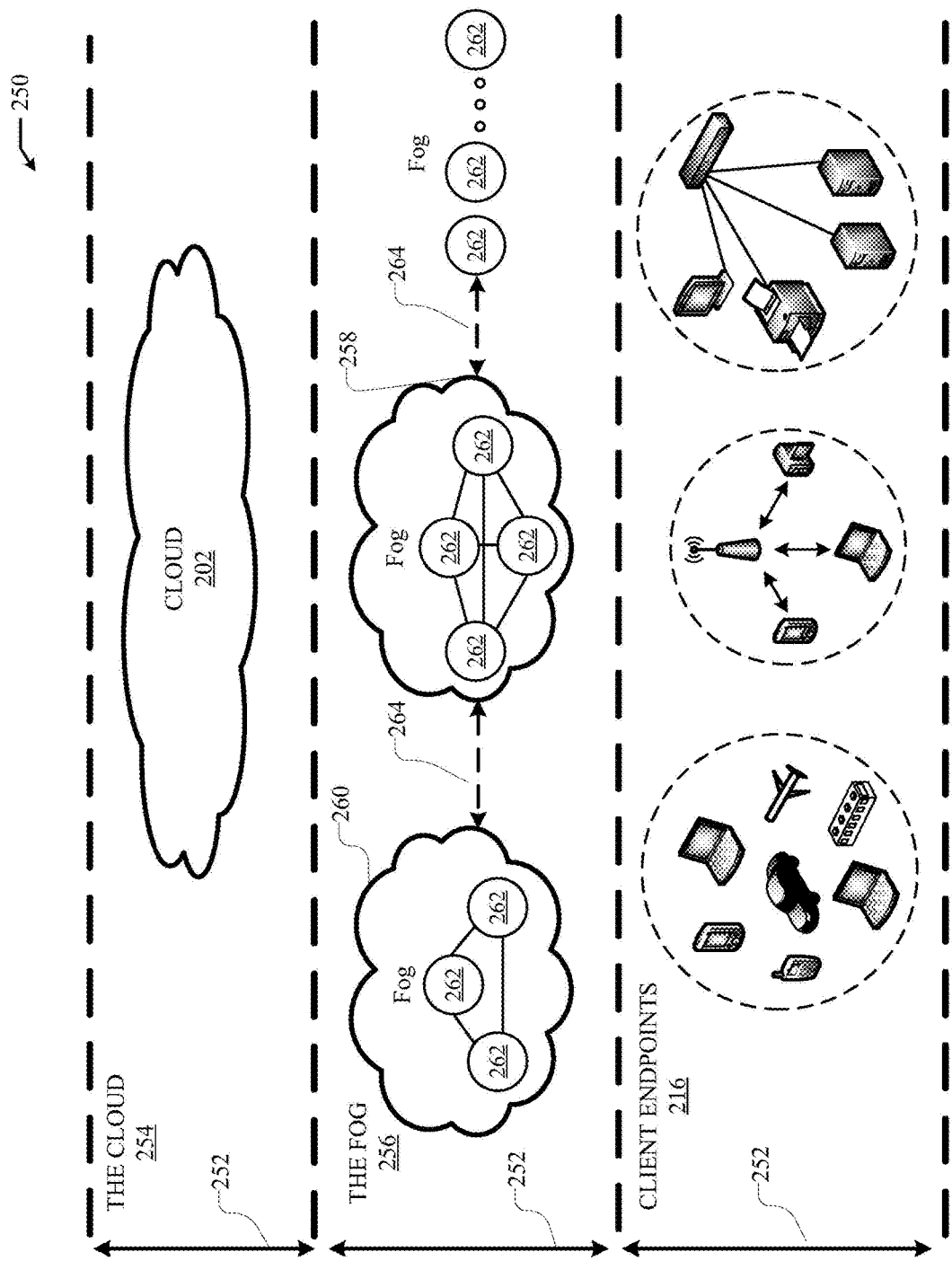
FIG. 2B illustrates an example fog computing architecture in accordance with some aspects of the present disclosure.
Figure 7:
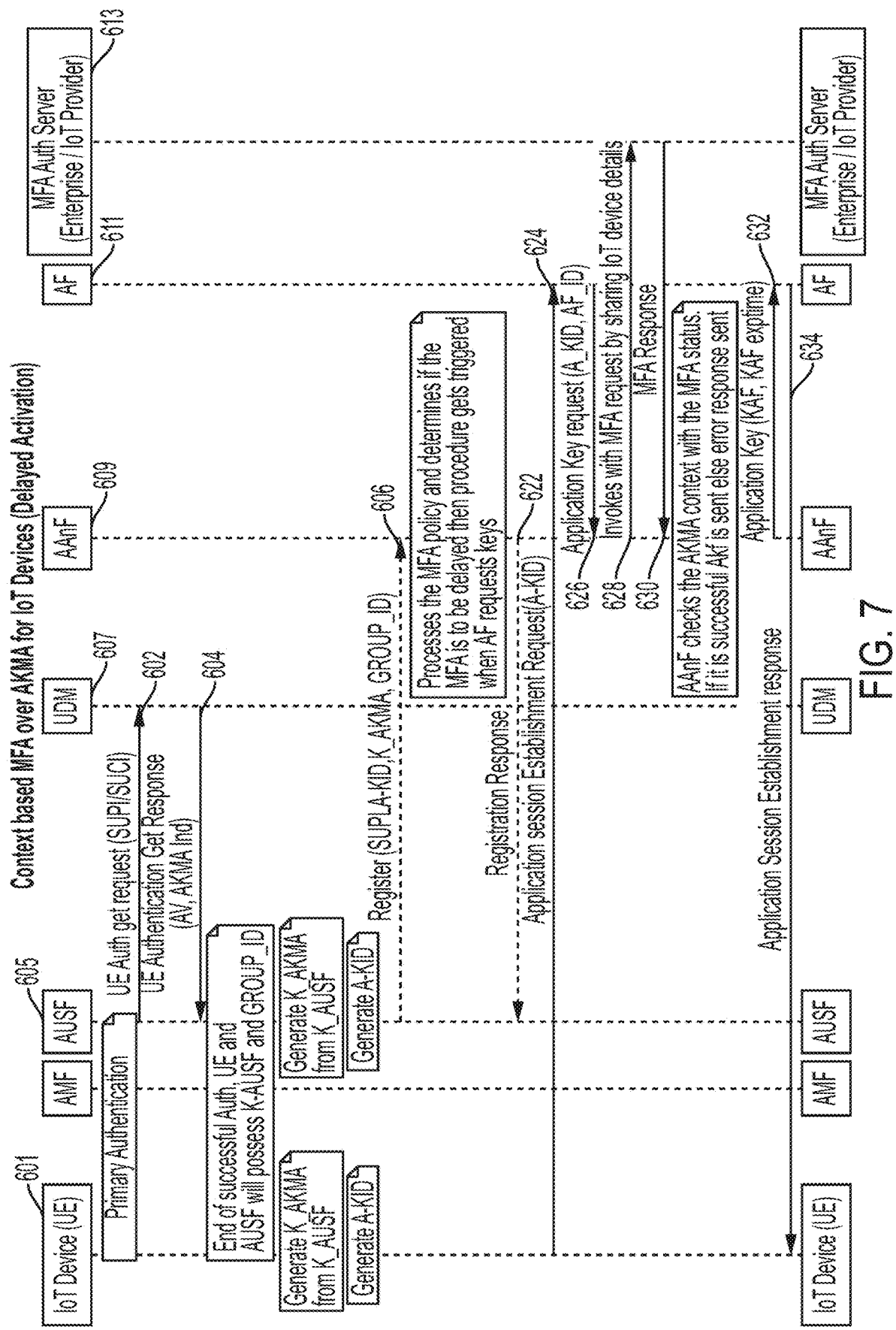
FIG. 7 illustrates multi-user multi-factor authentication in accordance with some aspects of the present disclosure.
Figure 8:
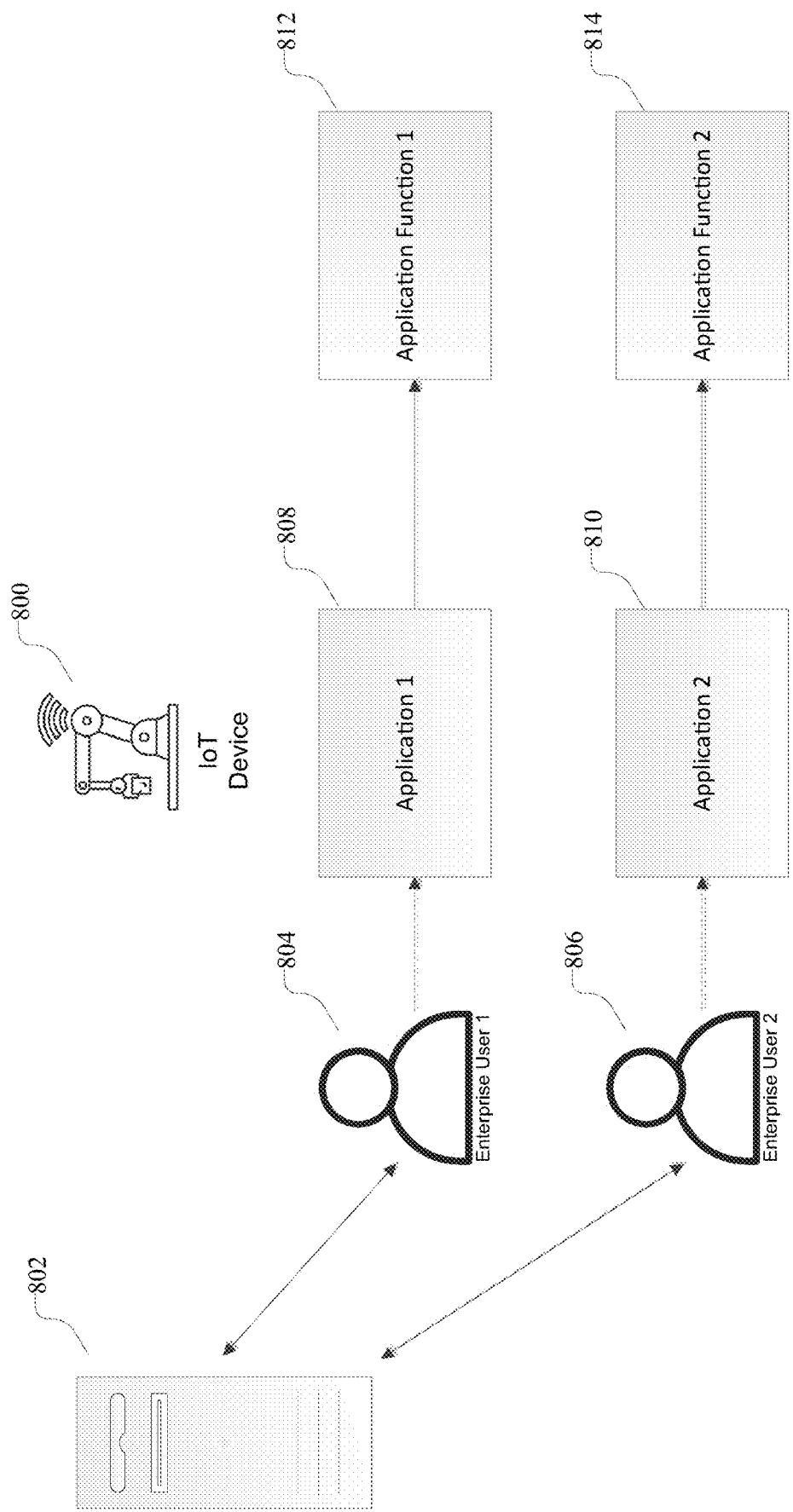
FIG. 8 illustrates a flowchart for enabling multi-factor authentication (MFA) for an Internet Of Things (IoT) device in accordance with some aspects of the present disclosure.

A description of network environments and architectures for network data access and services, as illustrated in FIGS. 1, 2A, and 2B is first disclosed herein. A discussion of systems, methods, and computer-readable medium for federating enterprises and SaaS providers using network slices, as shown in FIGS. 3-6, will then follow. The discussion then concludes with a brief description of example devices, as illustrated in FIGS. 7 and 8. These variations shall be described herein as the various embodiments are set forth. The disclosure now turns to FIG. 2A.

FIG. 2A illustrates a diagram of an example cloud computing architecture 200. The architecture can include a cloud 202. The cloud 202 can be used to form part of a TCP connection or otherwise be accessed through the TCP connection. Specifically, the cloud 202 can include an initiator or a receiver of a TCP connection and be utilized by the initiator or the receiver to transmit and/or receive data through the TCP connection. The cloud 202 can include one or more private clouds, public clouds, and/or hybrid clouds. Moreover, the cloud 202 can include cloud elements 204-214. The cloud elements 204-214 can include, for example, servers 204, virtual machines (VMs) 206, one or more software platforms 208, applications or services 210, software containers 212, and infrastructure nodes 214. The infrastructure nodes 214 can include various types of nodes, such as compute nodes, storage nodes, network nodes, management systems, etc.

The cloud 202 can be used to provide various cloud computing services via the cloud elements 204-214, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 216 can connect with the cloud 202 to obtain one or more specific services from the cloud 202. The client endpoints 216 can communicate with elements 204-214 via one or more public networks (e.g., Internet), private networks, and/or hybrid networks (e.g., virtual private network). The client endpoints 216 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 2B illustrates a diagram of an example fog computing architecture 250. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 250 can include the cloud layer 254, which includes the cloud 202 and any other cloud system or environment, and the fog layer 256, which includes fog nodes 262. The client endpoints 216 can communicate with the cloud layer 254 and/or the fog layer 256. The architecture 250 can include one or more communication links 252 between the cloud layer 254, the fog layer 256, and the client endpoints 216. Communications can flow up to the cloud layer 254 and/or down to the client endpoints 216.

The fog layer 256 or "the fog" provides the computation, storage and networking capabilities of traditional cloud networks, but closer to the endpoints. The fog can thus extend the cloud 202 to be closer to the client endpoints 216. The fog nodes 262 can be the physical implementation of fog networks. Moreover, the fog nodes 262 can provide local or regional services and/or connectivity to the client endpoints 216. As a result, traffic and/or data can be offloaded from the cloud 202 to the fog layer 256 (e.g., via fog nodes 262). The fog layer 256 can thus provide faster services and/or connectivity to the client endpoints 216, with lower latency, as well as other advantages such as security benefits from keeping the data inside the local or regional network(s).

The fog nodes 262 can include any networked computing devices, such as servers, switches, routers, controllers, cameras, access points, gateways, etc. Moreover, the fog nodes 262 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 262 can be deployed within fog instances 258, 260. The fog instances 258, 258 can be local or regional clouds or networks. For example, the fog instances 256, 258 can be a regional cloud or data center, a local area network, a network of fog nodes 262, etc. In some configurations, one or more fog nodes 262 can be deployed within a network, or as standalone or individual nodes, for example. Moreover, one or more of the fog nodes 262 can be interconnected with each other via links 264 in various topologies, including star, ring, mesh or hierarchical arrangements, for example.

In some cases, one or more fog nodes 262 can be mobile fog nodes. The mobile fog nodes can move to different geographic locations, logical locations or networks, and/or fog instances while maintaining connectivity with the cloud layer 254 and/or the endpoints 216. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 254 while located at the starting location and switch to a different physical and/or logical connection point with the cloud 254 while located at the destination location. The particular fog node can thus move within particular clouds and/or fog instances and, therefore, serve endpoints from different locations at different times.

Figure 3:
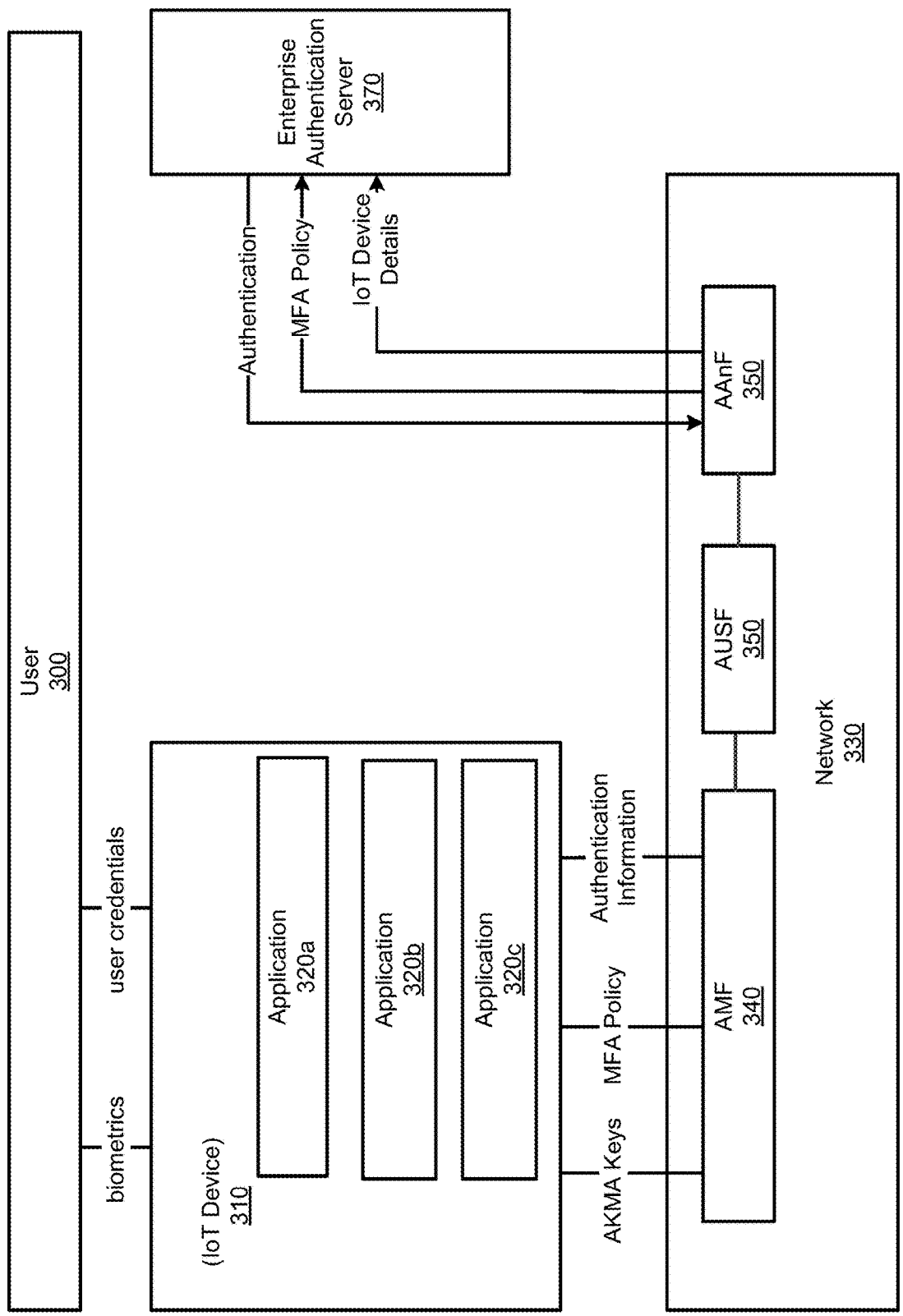
FIG. 3 illustrates an example multi-factor authentication (MFA) system in accordance with some aspects of the present disclosure.

FIG. 3 illustrates an example multi-factor authentication (MFA) system in accordance with some aspects of the present technology. User 300 can gain authorized access to a network 330 by using IoT device 310. For example, the IoT device can be, but not limited to, a health care device, a rental car, a social media service, or an access device.

The network can be a cellular network such as a 4G Network, LTE Network, a 5G network, or Enterprise 5G network. In some embodiments the network can be accessed by user 300 through an access device, such as a mobile phone or personal computer. In some embodiments, the network 330 can be accessed by user 300 through an application that is specifically designed for accessing the network 330, or through a more general application which can access multiple services, such as a web browser, or portions of an operating system. In some embodiments, the network 330 can include a plurality of resources, such as an access device, an application function and a service which receive separate authentications to the network 330 from an enterprise authentication server 370.

The network 330 can authenticate the identity of user 300 through the enterprise authentication server 370, which can be in communication with IoT device 310. Data gathered by IoT device 310 can be used for authentication of user 300 to network 330 via an access and mobility management function (AMF) 340. The data that is gathered is maintained by the AUSF 350. The AUSF 350 is configured to store the data to be used for authentication in case of simultaneous registration of the IoT device 310 for one or more applications 320a-c. The data can be authentication information such as subscription credentials, authentication vectors, user identification credentials, and device identification credentials. Based on the authentication information, a unified data management function of the network can identify whether AKMA keys need to be generated and the details of an MFA policy associated with the user and one or more applications 320a-c of the IoT device. Enterprise authentication server 370 can receive the MFA policy request from the network 330 to determine an activation period for the MFA policy of the IoT device 310 via an AKMA anchor function (AAnF) 360 that is unique to the network 330 and selected by the authentication server function (AUSF).

Enterprise authentication server 370 can also receive device details from IoT device 310 via the AAnF 360 of the network 330. Upon receiving the MFA policy request and the IoT device 310 details, the enterprise authentication server 370 can respond to the request by sending an authorization indication to the AAnF 360. On successful authentication, the IoT Device 310 receives the AKMA keys to derive other keys to authenticate the user 300 to operate one or more of the applications 320a-c of the IoT Device 310.

To generate identification credentials, IoT device 310 can be associated with user 300 and can gather biometric, behavioral, and contextual data from user 300. The biometric, behavioral, or contextual data, or some combination thereof, can be used to generate unique authentication information corresponding to the user's intended access of the network 330. These biometrics can include, for example, fingerprints, facial detection, retinal scans, voice identification, or gait data, among other biometrics. In some embodiments, the authentication information may only be derived when IoT device 310 determines that certain behavioral and contextual requirements indicate compliance with a policy. In some embodiments, there can be a "master" key related to the authentication information that is used to gain access to the network 330.

In some embodiments, user credentials can be used to ensure that the user 300 is authorized to access one or more of the applications 320*a-c* as specified by an MFA policy of the network 330. The user credentials can be used by the AANF 360 in the authentication of user 300, as specified by the MFA policy of the network 330.

The enterprise authentication server 370 can request updated authentication information and MFA policies at different intervals depending on the requirements specified by the access policies defined by network 330. It can send new access policies received from network 330 during an establishment session to IoT device 310. Enterprise authentication server 370 can shield private information from the network 330, providing authorization for the IoT device 310 without revealing personal information such as birth dates, social security numbers, or marital status, etc. In some embodiments, enterprise authentication server 370 need only inform network 330 that access should be granted.

User 300 can be any user including an employee, contractor, client, member of an organization, or private individual, etc. attempting to access a service or application of the IoT device 310. User 300 can use an access device to access network 330 which may or may not be the same device as IoT device 310. In some embodiments, IoT device 310 can be used to authenticate an access device.

IoT device 310 can be hardware, software-only, or combinations thereof. IoT device 310 can be a mobile device or a personal computer; it may or may not be the same device as the access device. In some embodiments, IoT device 310 can include secure hardware.

While FIG. 3 only illustrates multiple applications 320*a-c*, and one network 330, it should be appreciated that there can be any number of applications 320*a-c* or networks 330. Each resource network can have an MFA policy, and any number of authentication information that will be unique to each respective resource network.

Figure 4:
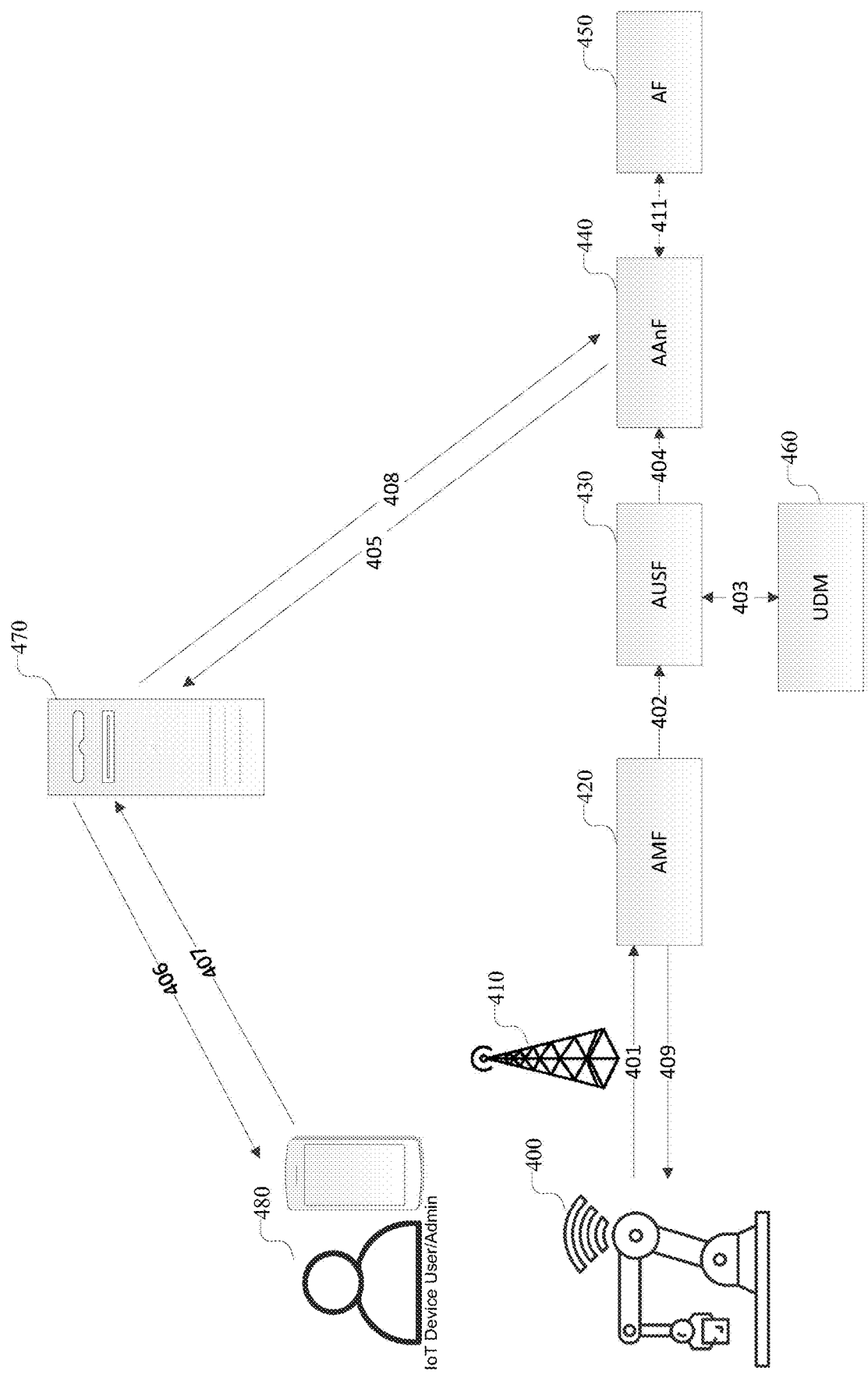
FIG. 4 illustrates an example of Authentication and Key Management for Applications (AKMA) multi-factor authentication (MFA) enforcement in accordance with some aspects of the present disclosure.

FIG. 4 illustrates an example of Authentication and Key Management for Applications (AKMA) multi-factor authentication (MFA) enforcement in accordance with some aspects of the present disclosure. As illustrated in FIG. 4, an IoT device (hereinafter device) 400 may subscribe to a 5G provider enterprise, or IoT provider (hereinafter provider) 470 in order to connect to an application over a network. Accordingly, the provider provides 401 access details related to information for multi-factor authentication (MFA) to the enterprise authentication server 470, in response to an MFA request.

In order to authenticate the device 400 within a 5G system 410, the device 400 can be authenticated based on the enforcement of the AKMA MFA policy. Accordingly, in step 401, during primary authentication of the device 400 in the 5G system 410, the request can be sent to an access and mobility function (AMF) 420.

Upon receiving the request, in step 402 the AMF 420 connects with the Authentication Server Function (AUSF) 430 to complete the authentication of the device 400. The AUSF 430 is configured to perform the authentication of the device based on the request that is received by the device within the 5G system. In some examples, the authentication can be a subscription-based authentication.

In step 403, the AUSF 430 can interact with a unified data manager (UDM) 460 in order to fetch authentication information, such as subscription credentials or Authentication and Key Agreement (AKA) authentication vectors, and the associated method of authentication. In response, the UDM may also indicate to the AUSF 430, whether AKMA anchor keys need to be generated for the device 400, as well as provide the details of the MFA policy associated with the authentication. In an example, if the AUSF 430 receives the AKMA indication from the UDM 460, the AUSF 430 can store the AKMA AUSF Key received from the UDM 460 and generate the AKMA anchor key and an AKMA Key identifier (ID) (A-KID) of the device 400 after the primary authentication has been completed.

In step 404, after the AKMA anchor key and AKMA key ID have been generated, the AUSF 430 can select an AKMA Anchor Function (AAnF) 440 to perform the authentication with the device 400 and maintain the device's 400 authentication information. The AUSF 430 can then send the generated A-KID and the AKMA anchor key to the AAnF 440 together with the Subscription Permanent Identifier (SUPI) of the UE, and the MFA policy details. The AAnF 440 can then be configured to perform the fulfillment of the MFA policy in order to subscribe the device 400 to the 5G system 410.

In step 405, the AAnF 440 can process the MFA policy and determine if the MFA is to be activated immediately or if a delayed activation has been specified. If a delayed activation has been specified, the verification of the MFA policy will not be enforced in the authentication phase until the specified delay period has been reached. Where the MFA policy is to be activated immediately, the AAnF 440 check if there are time and location bounds. If time and location bounds have been specified in the MFA policy, the AAnF 440 checks the current location of the device 400, to ensure that the location bound has been met. If the location has been met, the AAnF 440 invokes 405 the provider's authentication server 470 with the information of the underlying device 400 attempting to authenticate.

In step 406, the authentication server 470 will determine the latest ownership and administrator (admin) of the device 400. The authentication server 470 can then trigger the MFA configuration on the administrator's registered client 480 in order to accept the authorization of the device 400. In step 407, the response from the administrator registered client 480 (accepted or rejected) regarding the device authorization is sent back to the authentication server 470. For example, the administrator registered client can be operable by an administrator user of the private network, and the device can be operable by a user who is affiliated with the private network of the administrator as an employee, a contractor, or in operation of a device that is registered for operation in the private network.

In step 408, the authentication server 470 sends an authorization decision of the acceptance or rejection, received from the administrator client 480 back to the AAnF 440. The confirmation can be stored in the AAnF 440 server. The AAnF 440 maintains the AKMA context for the device 400 with the status of the MFA, based on the confirmation received.

In step 409, upon confirmation of successful authentication, the device 400 can receive the AKMA AUSF Key, initially stored by the UDM 460. Accordingly, in step 401, upon the device 400 initiating communication with the AKMA application function (AF) 450, the device 400 can send a session establishment message. The session establishment message can include the derived A-KID. If the AF 450 does not have an active context associated with the A-KID, the AF 450 can be configured to select the AAnF 440 and sends a request 411 to the AAnF 440 with the A-KID to request the AKMA Application Key for the device 400. The AF 450 can also include an identifier identifying the AF 450 (AF ID) in the request 411. The AAnF 440, can then check the AKMA context and ensure if the device 400 is fully authorized to access the private network. If the device 400 is authorized, the AAnF 440 sends the AKMA Application Key and an expiration time for the AKMA Application Key to the AF 450. In an instance where the MFA fails, an error response can be returned to the device indicating that the device cannot be authorized.

Figure 5:
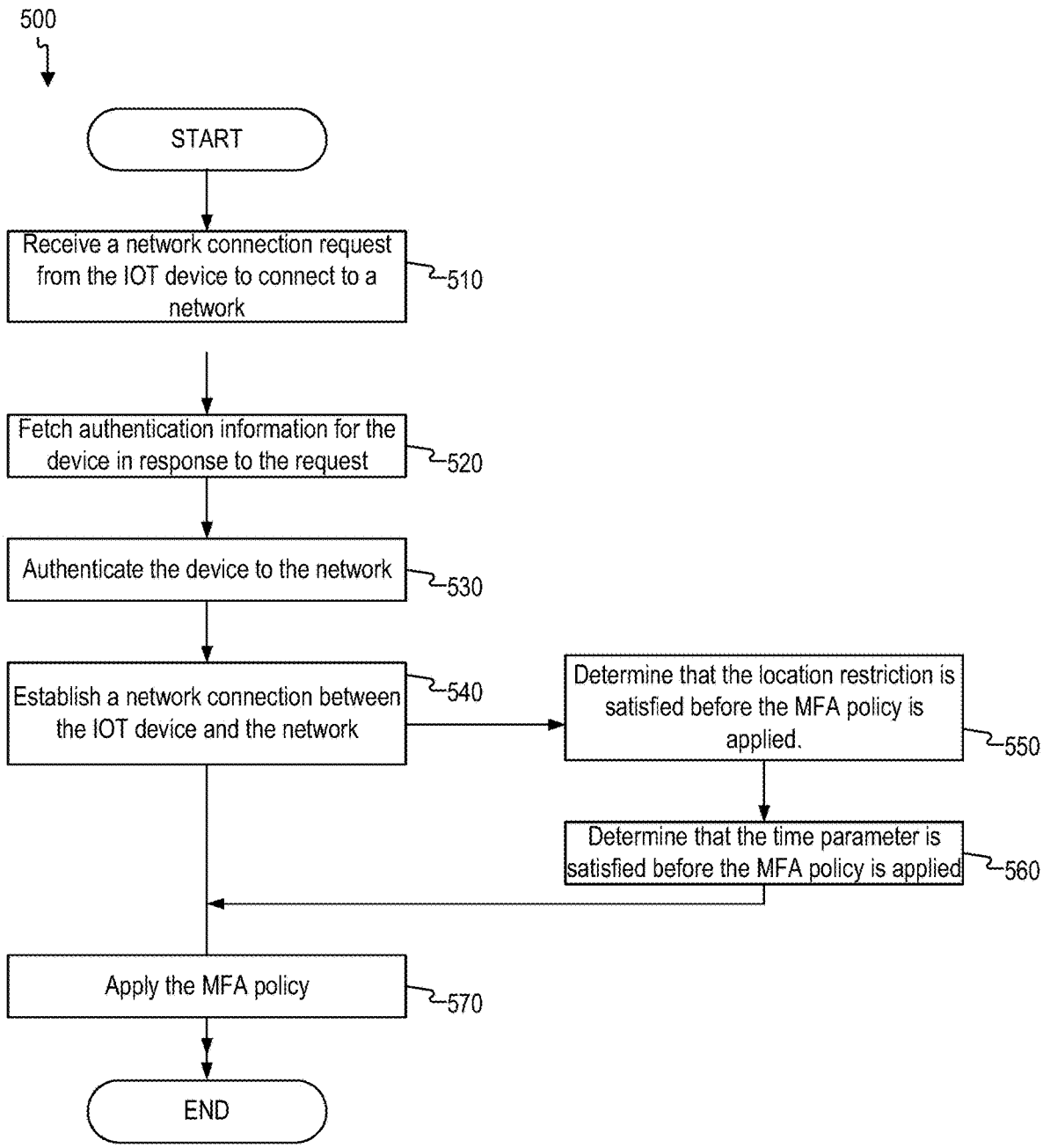
FIG. 5 illustrates an example communication diagram for a process of immediate context-based MFA over AKMA for IoT devices in accordance with some aspects of the present disclosure.

FIG. 5 illustrates a flowchart for enabling multi-factor authentication (MFA) for an Internet of Things (IoT) device in accordance with some aspects of the present disclosure. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method includes receiving a network connection request from the IoT device to connect to a network at block 510. For example, the AUSF 430 illustrated in FIG. 5 may receive a network connection request from the IoT device to connect to a network. In some examples, the cellular network is a 4G network, an LTE network, or a 5G network. Further, the network is a cellular network that utilizes authentication and key management for applications (AKMA) to authenticate the IoT device to the cellular network. A controller, operating as an AKMA Anchor Function, can be utilized to facilitate the network connection request and determine if the IoT device and an associated user are authenticated to access the network.

According to some examples, the method includes fetching authentication information for the device in response to the request at block 520. For example, the AUSF 430 illustrated in FIG. 4 may fetch authentication information for the device from the UDM in response to the request. The fetched authentication information can then be processed by the AAnF to determine if an activation period applies to the authentication of the device. The activation period determines whether the MFA policy is applied when authenticating the device to the network, or when the IoT device attempts to connect to the application. If an activation period, such as a delayed activation period is defined, the AAnF determines if a location restriction or a user restriction applies to the authentication of the device.

When the activation period defined by the MFA policy is a delayed activation policy, the MFA policy should be applied when the IoT device attempts to establish a session with the application. Accordingly, the location restriction defines a location that the MFA device needs to be located to establish a session. The user restriction defines at least one user to provide the MFA.

For example, the user restriction defines a first user to provide the MFA at a first time or location, and a second user to provide the MFA at a second time or location. Further, the MFA policy defines a first MFA procedure for a first application of the plurality of applications, and a second MFA procedure for a second application of the plurality of applications. The permitting of each of these sessions for each application in a plurality of applications can be defined, according to the MFA policy in accordance with a defined activation period, time parameter, location restriction, user restriction and a defined a single sign-on policy for each user of the applications. In another example, authentication information can be processed that can include subscription credentials to authenticate the IoT device to the network, and an MFA policy that defines a user or location restriction to authentication of the IoT device to an application accessed over the network.

According to some examples, the method includes authenticating the device to the network at block 530. For example, the enterprise authentication server 470 illustrated in FIG. 4 may authenticate the device to the network. The authentication, possessing the latest stored ownership and authentication information for the device, can trigger an MFA confirmation, for an administrator to accept the device's authorization to access the network.

Further, the method comprises enforcing the MFA policy upon successful MFA authentication and providing an application key and an expiration time for the application key to an application function associated with an application of the device. For example, the AANF 440 illustrated in FIG. 4 may enforce the MFA policy upon successful MFA authentication and providing an application key and an expiration time for the application key to an application function associated with an application of the device.

According to some examples, the method includes establishing a network connection between the IoT device and the network at block 540. For example, the application function 450 illustrated in FIG. 4 may establish a network connection between the IoT device and the network.

According to some examples, the method includes determining that the location restriction is satisfied before the MFA policy is applied, at block 550. For example, the AAnF 440 illustrated in FIG. 4 may determine that the location restriction is satisfied before the MFA policy is applied.

According to some examples, the method includes determining that the time parameter is satisfied before the MFA policy is applied at block 560. For example, the AAnF 440 illustrated in FIG. 4 may determine that the time parameter is satisfied before the MFA policy is applied.

According to some examples, the method includes applying the MFA policy at block 570. For example, the authentication server 470 illustrated in FIG. 4 may apply the MFA policy. Accordingly, after successful compliance with the MFA policy, the device is permitted access and authorization to access the network.

Figure 6:
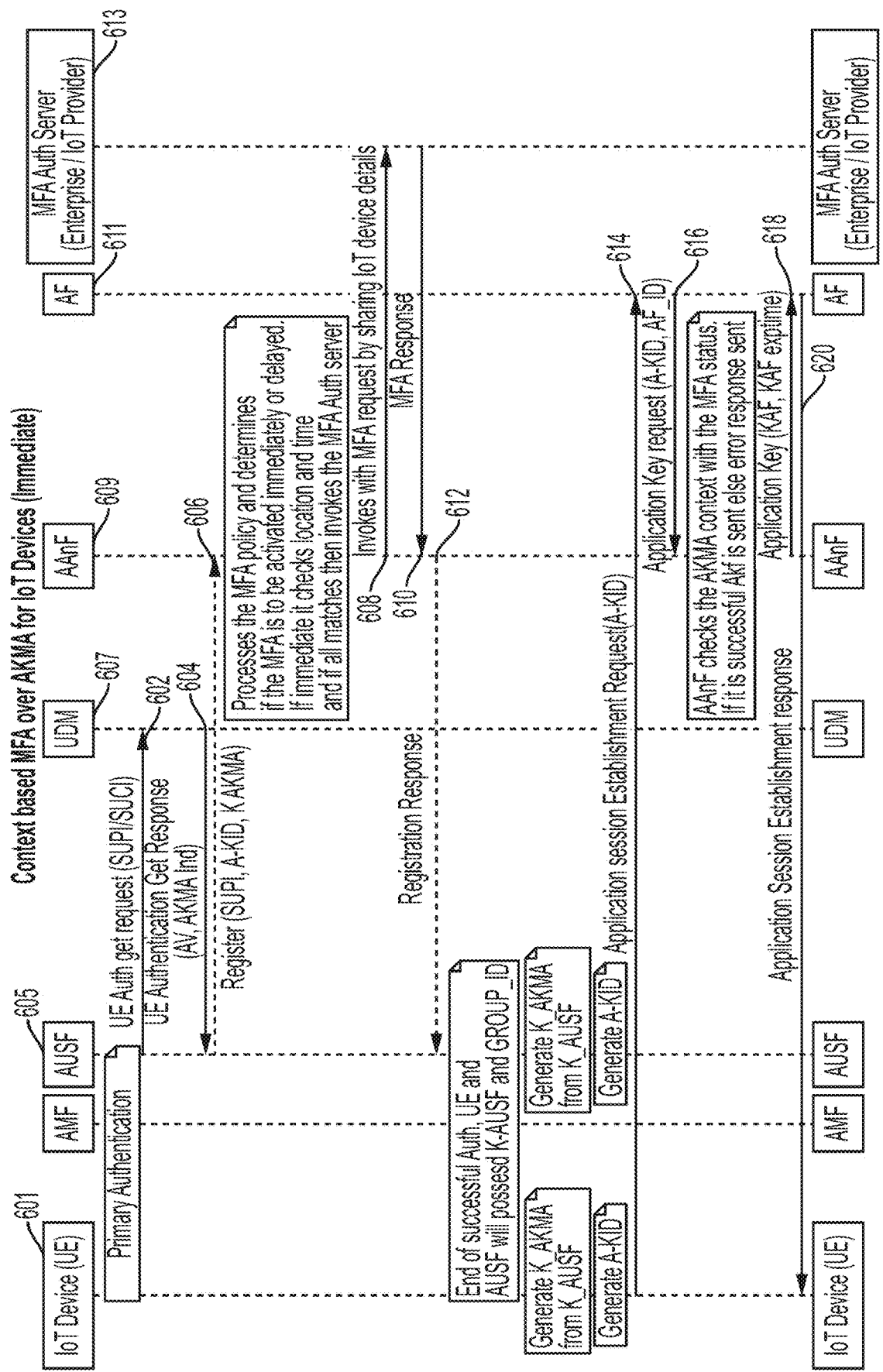
FIG. 6 illustrates an example communication diagram for a process of a delayed reaction context-based MFA over AKMA for IoT devices in accordance with some aspects of the present disclosure.

FIG. 6 illustrates an example communication diagram for a process of immediate context-based MFA over AKMA for IoT devices in accordance with some aspects of the present disclosure. In an example, in an instance where AAnF has processed the MFA policy, and a delayed activation is not specified, enforcement of the MFA policy with take place immediately as discussed with regards to the AAnF 440 preparing to invoke the authentication server 470 with regards to step 405 of FIG. 4.

In order to initiate the authorization of a device 601 to a network, a primary authentication can be configured. Referring to step 602 as illustrated in FIG. 6, the AUSF 605 transmits a device authorization request to the UDM 607, along with a SUPI identifying the device 400. The authorization request further can include a request to receive the AKMA AUSF Key, the AKMA Key Identifier of the device 601, and AKMA Anchor Key from the UE. The UDM, in step 604, responds to the AUSF 605 authentication request, and sends a response back to the AUSF 605, indicating whether the authentication request is accepted. Based on an acceptance of the device authentication request, in step 606, the AUSF 605 sends a registration request, for the device 601, to the AAnF 609, along with the MFA policy. The AAnF 609 process the MFA policy and determines if the MFA policy is to be activated immediately or delayed. Upon determining that the MFA is to be activated immediately, the AAnF 609 checks the location of the device 401, and the time, and determines if the time and location match the specified time and location bounds in the MFA policy. If the time and location bounds match, then the AAnF 609 invokes the MFA authentication server, as shown in step 608. In step 610, the MFA authentication server then sends an MFA response to the AAnF 609, indicating whether the authorization of the device 400 is successful. In step 612, the AAnF 609 sends a response to the registration request. If successful, the device 601 is authenticated and the device 601, as well as the AUSF 605 are able to possess the AKMA AUSF Key as well as the group identification the device belongs to. Accordingly, the AUSF shall store the AKMA AUSF Key and generate the AKMA Anchor Key and the A-KID from AKMA AUSF Key after the primary authentication procedure is successfully completed.

In step 614, after primary authentication, the device 601 sends a request to the AF 611 to establish an application session. The AF 611, upon receipt of the request, sends an application key request 616 to the AAnF 609, requesting the A-KID of the UE. The AAnF 609 checks the AKMA context with the MFA status, and if successful, the AAnF sends an acknowledgment of device authorization along with the application key for the device, to the AF 611, in step 618. In step 620, the AF 611, upon receipt of the application key, sends an application session establishment response to the device 601.

FIG. 7 illustrates an example communication diagram for a process of a delayed reaction context-based MFA over AKMA for IoT devices in accordance with some aspects of the present disclosure. Referring to step 606 of FIG. 6, if the AAnF 609 process the MFA policy and determines that the MFA policy is to be delayed, MFA policy enforcement can be delayed until the application tries to contact the AF 611. In step 622, the AAnF 609 sends a response to this effect, to the AUSF. In step 624, when the UE initiates communication with the AKMA AF, it can include the derived A-KID in an Application Session Establishment Request message sent to the AF 611. The AF, in step 626, sends an application key request to the AAnF 609. The AAnF, in response, in step 628, invokes the MFA policy, and sends a MFA request, by sharing device information with the MFA Authentication Server 613, including but not limited to the device's location. In step 630, the MFA Authentication Server 613 responds to the MFA request, providing a status of the MFA. The AAnF 609, in step 632 can then send the application key, and an expiration time of the application key to the AF 611. Upon receipt of the application key, in step 634, the AF 611 sends an application session establishment response to the device 601, facilitating the device's 601 connection to the network.

FIG. 8 illustrates multi-user multi-factor authentication in accordance with some aspects of the present disclosure. In some examples, a device can have multiple applications. Accordingly, various applications of the device can also be tied to multiple users who may have authorization not possess the device. Accordingly, the example as illustrated by FIG. 8 depicts an example where the ownership of application tied to single user or multiple users. An indication can be provided by the AKMA MFA policy that indicates whether a multi-user authentication is required for a particular application of the device. Accordingly, the MFA policy can be obtained per application, through a delayed activation of the MFA policy, in order to authenticate multiple users of one or more applications of the device.

As illustrated in FIG. 8, a device 800 can be in communication with an authentication server, configured to process MFA policies for multiple users 804 and 806. Accordingly, the device 800, can have multiple functions that are capable of maintaining the authorization for multiple users to be authenticated for one or more applications of the device. Thus, as the ownership of the applications change, access to these applications can be based on the individual MFA of each user for a single primary authorization. As a user 804 operates application 808 and user 806 operate application 810 to access an application function 812 and 814 associated with an enterprise of AFs for an application on the device, the enterprise authentication server 802 can determine if the user 804 and 806 has MFA access. Accordingly, if multiple applications are supported for the single user, then with one successful MFA access as indicated by the enterprise authentication server 802, the users 804 and 806 will have access to additional applications on the device as well.

Figure 9:
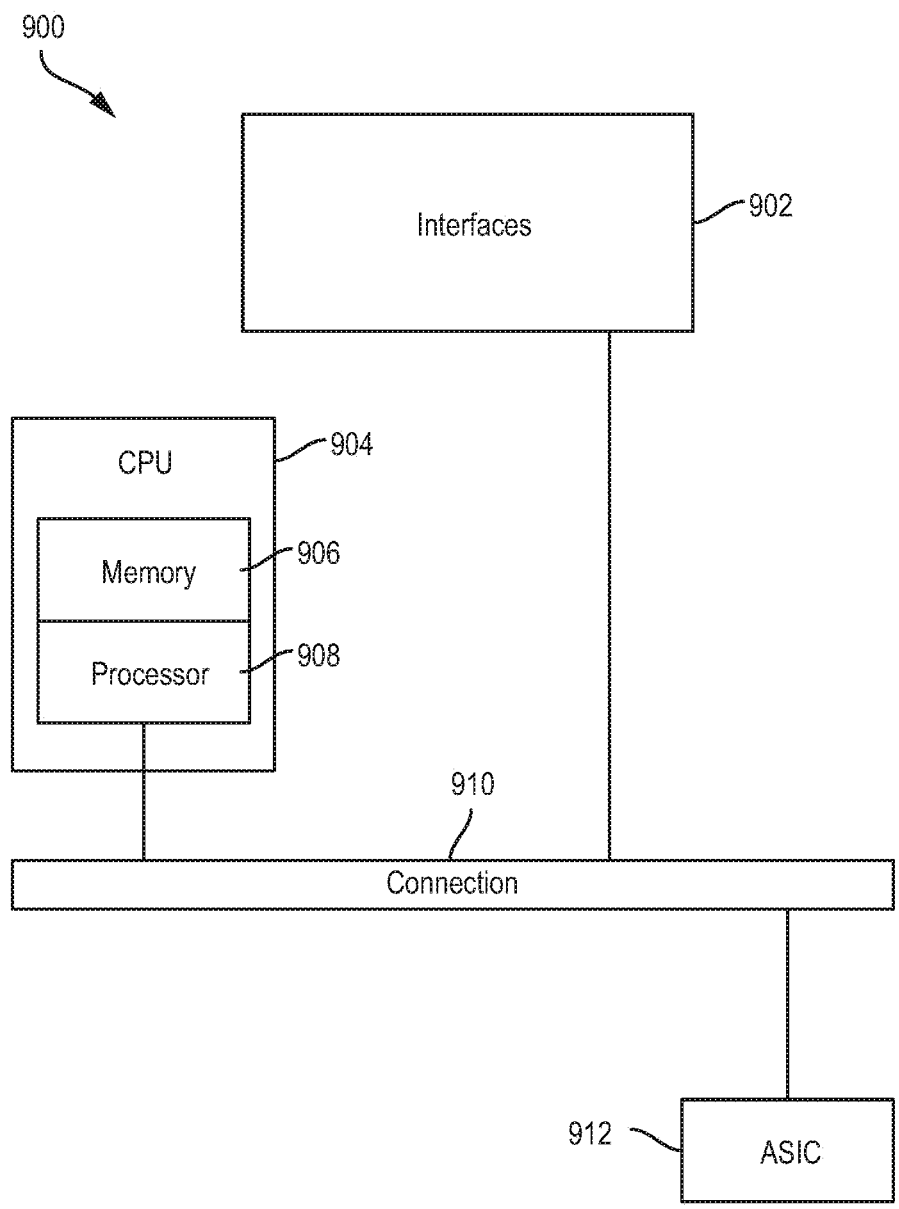
FIG. 9 illustrates an example network device in accordance with some examples of the disclosure.

FIG. 9 illustrates an example network device 900 suitable for performing switching, routing, load balancing, and other networking operations. The example network device 900 can be implemented as switches, routers, nodes, metadata servers, load balancers, client devices, and so forth.

Network device 900 includes a central processing unit (CPU) 904, interfaces 902, and a bus 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 904) to efficiently perform routing computations, network diagnostics, security functions, etc.

Although the system shown in FIG. 9 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC) 912, which can be configured to perform routing and/or switching operations. The ASIC can communicate with other components in the network device 900 via the connection 910, to exchange data and signals and coordinate various types of operations by the network device 900, such as routing, switching, and/or data storage operations, for example.

Figure 10:
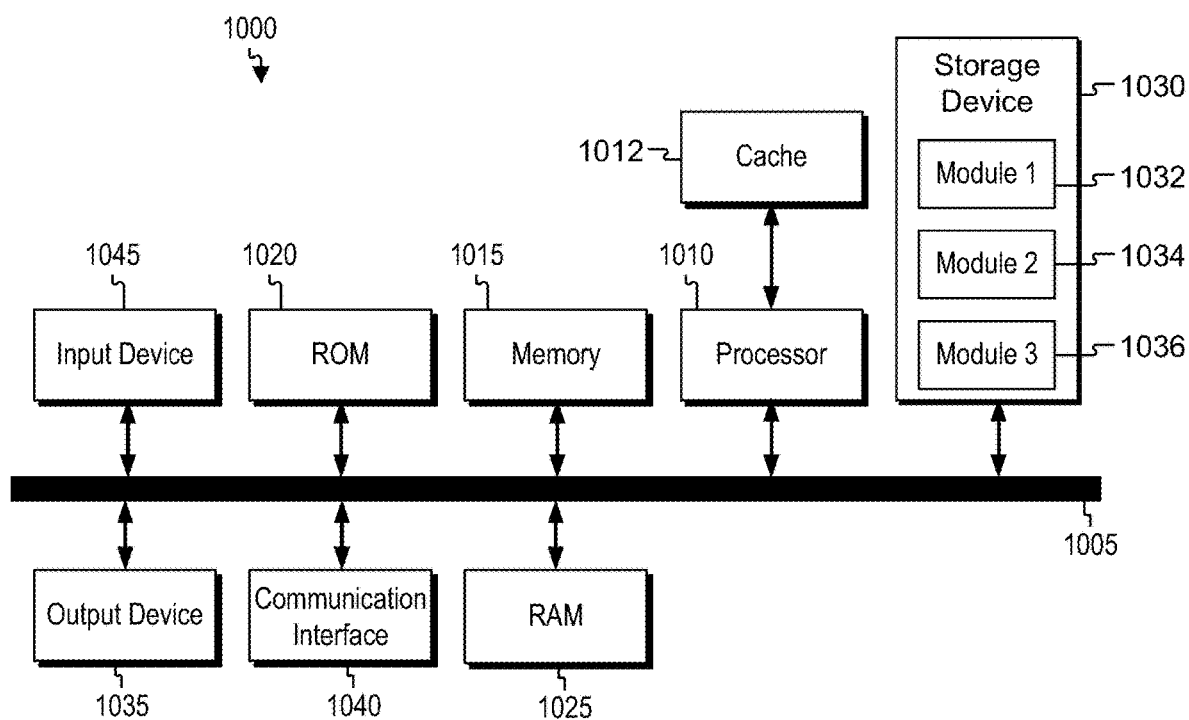
FIG. 10 shows an example of computing system 1000, which can be for example any computing device making up an IoT device, enterprise authentication server, AMF, AUSF, UDM, and/or AAnF.

FIG. 10 shows an example of computing system 1000, which can be for example any computing device making up an IoT device, enterprise authentication server, AMF, AUSF, UDM, and/or AAnF or components of any of these. Connection 1005 can be a physical connection via a bus, or a direct connection into processor 1010, such as in a chipset architecture. Connection 1005 can also be a virtual connection, networked connection, or logical connection.

In some embodiments computing system 1000 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read only memory (ROM) 1020 and random-access memory (RAM) 1025 to processor 1010. Computing system 1000 can include a cache of high-speed memory 1012 connected directly with, in close proximity to, or integrated as part of processor 1010.

Processor 1010 can include any general-purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. A method for enabling multi-factor authentication (MFA) for an Internet Of Things (IoT) device, the method comprising: receiving a network connection request from the IoT device to connect to a network; fetching authentication information for the device in response to the request, wherein the authentication information includes subscription credentials to authenticate the IoT device to the network, and a MFA policy that defines a user or location restriction to authentication of the IoT device to an application accessed over the network; authenticating the device to the network; in response to the authentication of the device to the network, establishing a network connection between the IoT device and the network; applying the MFA policy; after successful compliance with the MFA policy establishing a session between the IoT device and the application over the network.

Aspect 2. The method of Aspect 1, wherein the network is a cellular network that utilizes authentication and key management for applications (AKMA) to authenticate the IoT device to the cellular network.

Aspect 3. The method of any of Aspects 1 to 2, wherein the cellular network is a 4 G network, a LTE network, a 5 G network.

Aspect 4. The method of any of Aspects 1 to 3, wherein the controller is an AKMA Anchor Function.

Aspect 5. The method of any of Aspects 1 to 4, wherein the MFA policy defines an activation period, wherein the activation period determines whether the MFA policy is applied when authenticating the device to the network, or when the IoT device attempts to connect to the application.

Aspect 6. The method of any of Aspects 1 to 5, further comprising: when the activation period defined by the MFA policy is a delayed activation policy that requires that the MFA policies should be applied with the IoT device attempts to establish the session with the application; determining that the IoT device has requested to establish the session with the application before the MFA policy is applied.

Aspect 7. The method of any of Aspects 1 to 6, wherein the MFA policy defines a time parameter, the method further comprising: determining that the time parameter is satisfied before the MFA policy is applied.

Aspect 8. The method of any of Aspects 1 to 7, wherein the MFA policy defines the location restriction, wherein the location restriction defines a location that the MFA device needs to be located to establish a session, the method further comprising: determining that the location restriction is satisfied before the MFA policy is applied.

Aspect 9. The method of any of Aspects 1 to 8, wherein the MFA policy defines the user restriction, wherein the user restriction defines at least one user to provide the MFA.

Aspect 10. The method of any of Aspects 1 to 9, wherein the user restriction defines a first user to provide the MFA at first time or location, and a second user to provide the MFA at a second time or location.

Aspect 11. The method of any of Aspects 1 to 10, wherein the application is a plurality of applications, and the MFA policy defines a first MFA procedure for a first application of the plurality of applications, and a second MFA procedure for a second application of the plurality of applications.

Aspect 12. The method of any of Aspects 1 to 11, further comprising: enforcing the MFA policy upon successful MFA authentication and providing an application key and an expiration time for the application key to an application function associated with an application of the device.

Aspect 13. The method of any of Aspects 1 to 12, wherein the MFA policy defines a single sign-on policy, wherein the MFA policy requires a single MFA to permit the IOT device to establish sessions with multiple applications.

What is claimed is:

1. A method for enabling multi-factor authentication (MFA) for an Internet Of Things (IoT) device, the method comprising:
   receiving a network connection request from the IoT device to connect to a network;
   fetching authentication information for the IoT device in response to the request,
   wherein the authentication information includes subscription credentials to authenticate the IoT device to the network, and an MFA policy that defines a user or location restriction to authentication of the IoT device to an application accessed over the network;
   authenticating the device to the network;
   in response to the authentication of the device to the network, establishing a network connection between the IoT device and the network;
   after the device is authenticated and the network connection is established between the IoT device and network, determining if a location restriction is satisfied;
   in response to the location restriction being satisfied, applying the MFA policy; and
   after successful compliance with the MFA policy establishing a session between the IoT device and the application over the network.

2. The method of claim 1, wherein the network is a cellular network that utilizes an authentication and key management for applications (AKMA) to authenticate the IoT device to the cellular network.

3. The method of claim 2, wherein the network is a 4 G network, a LTE network, a 5 G network.

4. The method of claim 1, wherein the MFA policy defines an activation period, wherein the activation period determines whether the MFA policy is applied when authenticating the IoT device to the network, or when the IoT device attempts to connect to the application.

5. The method of claim 4, further comprising:
when the activation period defined by the MFA policy is a delayed activation policy that requires that the MFA policies should be applied with the IoT device attempts to establish the session with the application; and
determining that the IoT device has requested to establish the session with the application before the MFA policy is applied.

6. The method of claim 1, wherein the MFA policy defines a time parameter, the method further comprising: determining that the time parameter is satisfied before the MFA policy is applied.

7. The method of claim 1, wherein the MFA policy defines the user restriction, wherein the user restriction defines at least one user to provide the MFA.

8. The method of claim 7, wherein the user restriction defines a first user to provide the MFA at a first time or a first location, and a second user to provide the MFA at a second time or a second location.

9. The method of claim 1, wherein the application is a plurality of applications, and the MFA policy defines a first MFA procedure for a first application of the plurality of applications, and a second MFA procedure for a second application of the plurality of applications.

10. The method of claim 1, further comprising:
enforcing the MFA policy upon successful MFA authentication and providing an application key and an expiration time for the application key to an application function associated with the application of the IoT device.

11. The method of claim 1, wherein the MFA policy defines a single sign-on policy, wherein the MFA policy requires a single MFA to permit the IoT device to establish sessions with multiple applications.

12. A device for enabling multi-factor authentication (MFA) for an Internet Of Things (IoT) device comprising:
a processor; and a memory storing instructions that, when executed by the processor, configure the device to:
receive a network connection request from the IoT device to connect to a network;
fetch authentication information for the IoT device in response to the request, wherein the authentication information includes subscription credentials to authenticate the IoT device to the network, and a MFA policy that defines a user or location restriction to authentication of the IoT device to an application accessed over the network;
authenticate the device to the network;
in response to the authentication of the device to the network, establish a network connection between the IoT device and the network;
in response to the location restriction being satisfied, after the device is authenticated and the network connection is established between the IoT device and network, determining if a location restriction is satisfied;
in response to the location restriction being satisfied, apply the MFA policy; and
after successful compliance with the MFA policy establish a session between the IoT device and the application over the network.

13. The device of claim 12, wherein the network is a cellular network that utilizes an authentication and key management for applications (AKMA) to authenticate the IoT device to the cellular network.

14. The device of claim 12, wherein the MFA policy defines an activation period, wherein the activation period determines whether the MFA policy is applied when authenticate the device to the network, or when the IoT device attempts to connect to the application.

15. The device of claim 12, wherein the MFA policy defines a time parameter, the IoT device further configured to:
determine that the time parameter is satisfied before the MFA policy is applied.

16. The device of claim 12, wherein the application is a plurality of applications, and the MFA policy defines a first MFA procedure for a first application of the plurality of applications, and a second MFA procedure for a second application of the plurality of applications.

17. The device of claim 12, wherein the instructions further configure the device to:
enforce the MFA policy upon successful MFA authentication and providing an application key and an expiration time for the application key to an application function associated with the application of the IoT device.

18. A non-transitory computer-readable storage medium, the computer-readable storage medium including instructions that when executed by a computer, cause the computer to:
receive a network connection request from an IoT device to connect to a network;
fetch authentication information for the IoT device in response to the request, wherein the authentication information includes subscription credentials to authenticate the IoT device to the network, and a MFA policy that defines a user or location restriction to authentication of the IoT device to an application accessed over the network;
authenticate the device to the network;
in response to the authentication of the device to the network, establish a network connection between the IoT device and the network;
after the device is authenticated and the network connection is established between the IoT device and network, determining if a location restriction is satisfied;
in response to the location restriction being satisfied, apply the MFA policy; and
after successful compliance with the MFA policy establish a session between the IoT device and the application over the network.

* * * * *